US007037968B2

(12) United States Patent
Tsui et al.

(10) Patent No.: US 7,037,968 B2
(45) Date of Patent: May 2, 2006

(54) ADHESIVE

(75) Inventors: Sum-Wing Tsui, Leeds (GB); Anthony Francis Johnson, Leeds (GB)

(73) Assignee: Glued LTD, Leeds (GB)

( * ) Notice: Subject to any disclaimer, the term of this patent is extended or adjusted under 35 U.S.C. 154(b) by 208 days.

(21) Appl. No.: 10/221,416

(22) PCT Filed: Jan. 29, 2002

(86) PCT No.: PCT/GB02/00371

§ 371 (c)(1), (2), (4) Date: Mar. 31, 2003

(87) PCT Pub. No.: WO02/061011

PCT Pub. Date: Aug. 8, 2002

(65) Prior Publication Data

US 2003/0159775 A1    Aug. 28, 2003

(30) Foreign Application Priority Data

Jan. 29, 2001    (GB) .............................. 0102228.4

(51) Int. Cl.
C08K 3/08    (2006.01)

(52) U.S. Cl. ...................... 524/439; 524/476; 524/501; 524/504; 524/522; 524/524

(58) Field of Classification Search ................ 524/476, 524/501, 504, 522, 524, 439
See application file for complete search history.

(56) References Cited

U.S. PATENT DOCUMENTS

| 3,717,601 | A |   | 2/1973  | Jurrens |
|-----------|---|---|---------|---------|
| 3,929,550 | A |   | 12/1975 | Gaylord |
| 4,472,555 | A |   | 9/1984  | Schmukler et al. |
| 4,552,714 | A |   | 11/1985 | Krueger et al. |
| 4,554,304 | A |   | 11/1985 | Hansen et al. |
| 4,599,385 | A |   | 7/1986  | Clayton et al. |
| 4,617,240 | A |   | 10/1986 | Krueger et al. |
| 4,654,389 | A |   | 3/1987  | Graham et al. |
| 4,654,965 | A | * | 4/1987  | Uehara et al. ................ 29/830 |
| 4,664,984 | A |   | 5/1987  | Klosiewicz |
| 4,675,210 | A |   | 6/1987  | Clayton et al. |
| 4,726,869 | A |   | 2/1988  | Matsui et al. |
| 4,727,120 | A |   | 2/1988  | Nogues |
| 4,755,419 | A |   | 7/1988  | Shah |
| 4,921,921 | A |   | 5/1990  | Ritter |
| 5,036,140 | A |   | 7/1991  | Hwo |
| 5,041,338 | A | * | 8/1991  | Suehiro et al. ............. 428/516 |
| 5,296,554 | A | * | 3/1994  | Watanabe et al. ........... 525/207 |
| 6,306,520 | B1 |  | 10/2001 | Nagata et al. |
| 6,423,953 | B1 | * | 7/2002 | Johnson, Jr. ................ 219/634 |
| 6,451,425 | B1 |  | 9/2002  | Kozulla et al. |
| 2001/0008686 | A1 | | 7/2001 | Inoue et al. |
| 2002/0055561 | A1 | | 5/2002 | Haveaux et al. |

FOREIGN PATENT DOCUMENTS

| CA | 2 375 381 | | 12/2000 |
|----|-----------|---|---------|
| CA | 2 392 455 | | 4/2002 |
| EP | 0 317 359 | | 11/1988 |
| EP | 0 411 191 | A1 | 8/1989 |
| EP | 0 370 735 | | 11/1989 |
| EP | 0 370 736 | | 11/1989 |
| EP | 0 398 734 | | 5/1990 |
| EP | 0 480 069 | A1 | 4/1991 |
| EP | 0 501 762 | A1 | 2/1992 |
| EP | 0 620 109 | A1 | 10/1994 |
| EP | 1 125 980 | A1 | 8/2001 |
| EP | 1 231 236 | A1 | 8/2002 |
| GB | 2 246 741 | A | 2/1992 |
| WO |   1019851 | | 2/1966 |
| WO |   1059973 | | 2/1967 |
| WO | WO 94/04625 | | 3/1994 |
| WO | WO 95/09212 | | 4/1995 |
| WO | WO 96/09929 | | 4/1996 |
| WO | WO 96/33248 | | 10/1996 |
| WO | WO 98/28354 | | 7/1998 |
| WO | WO 02/09938 | A2 | 2/2002 |
| WO | WO 02/26495 | A1 | 4/2002 |

OTHER PUBLICATIONS

"Xiro Adhesive Films", xiro®, brochure, Nov. 2000, p. 1.

* cited by examiner

Primary Examiner—Bernard Lipman
(74) Attorney, Agent, or Firm—Beyer Weaver & Thomas LLP.

(57) ABSTRACT

An adhesive comprising: (a) 80 to 100% of a melt blend of 40 to 98% polyalphaolelin which has been grafted with 0 to 5% of at least 1 ethylenically unsaturated carboxylic acid or derivative thereof, (b) 2 to 60% of at least one copolymer of ethylene and vinyl acetate; (c) 0 to 20% of an opacifier; (d) optional further ingredients; wherein the total amount of components (a) and (b) is 80–100% of the composition and wherein the percentages of the components are selected to total 100%.

18 Claims, 2 Drawing Sheets

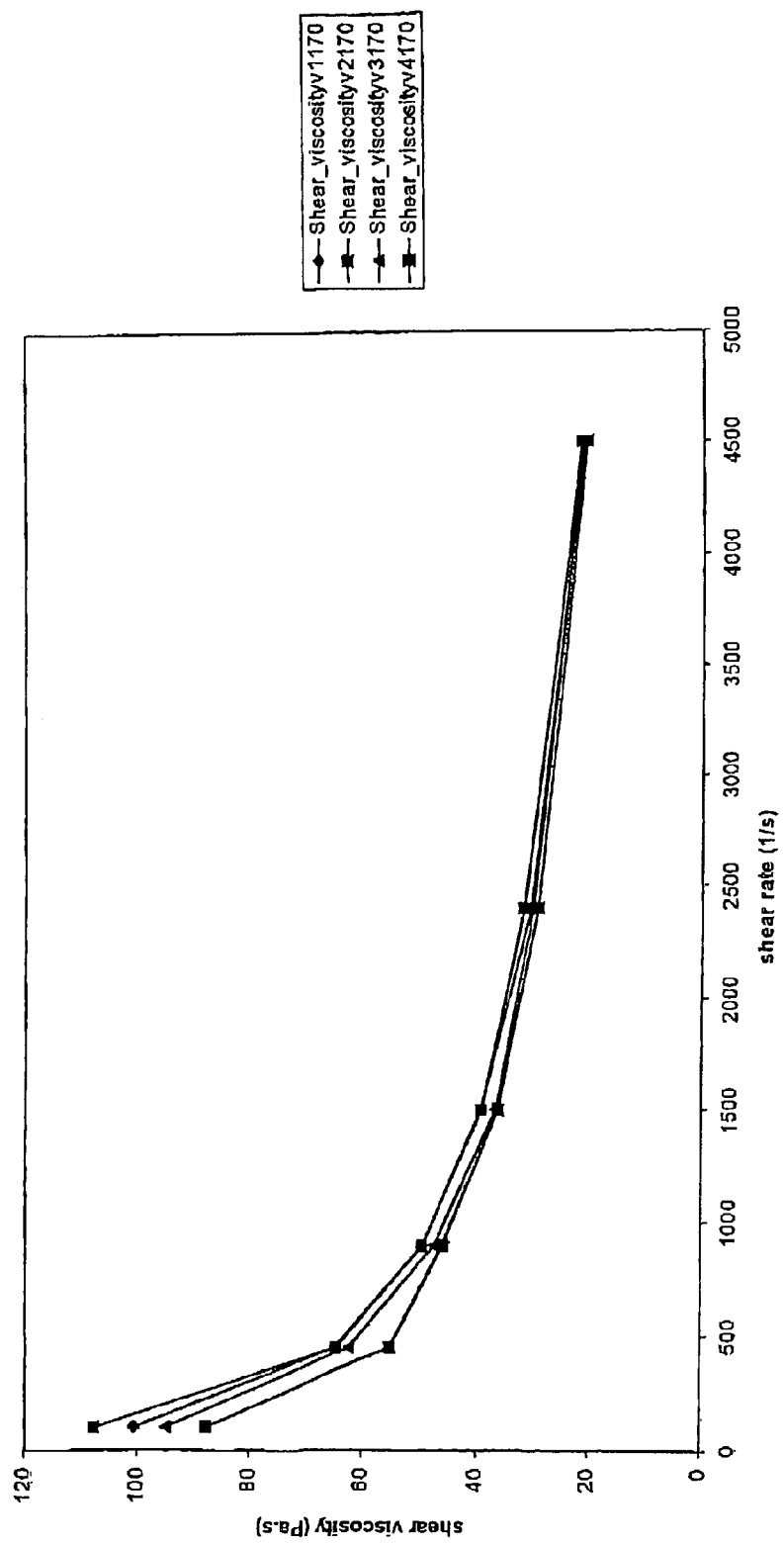
Figure 1  Comparisons of the plot of shear viscosity vs. shear rate of four heat-activated adhesives in this invention (v1– v4), using a 0.5 mm die at 170 °C.

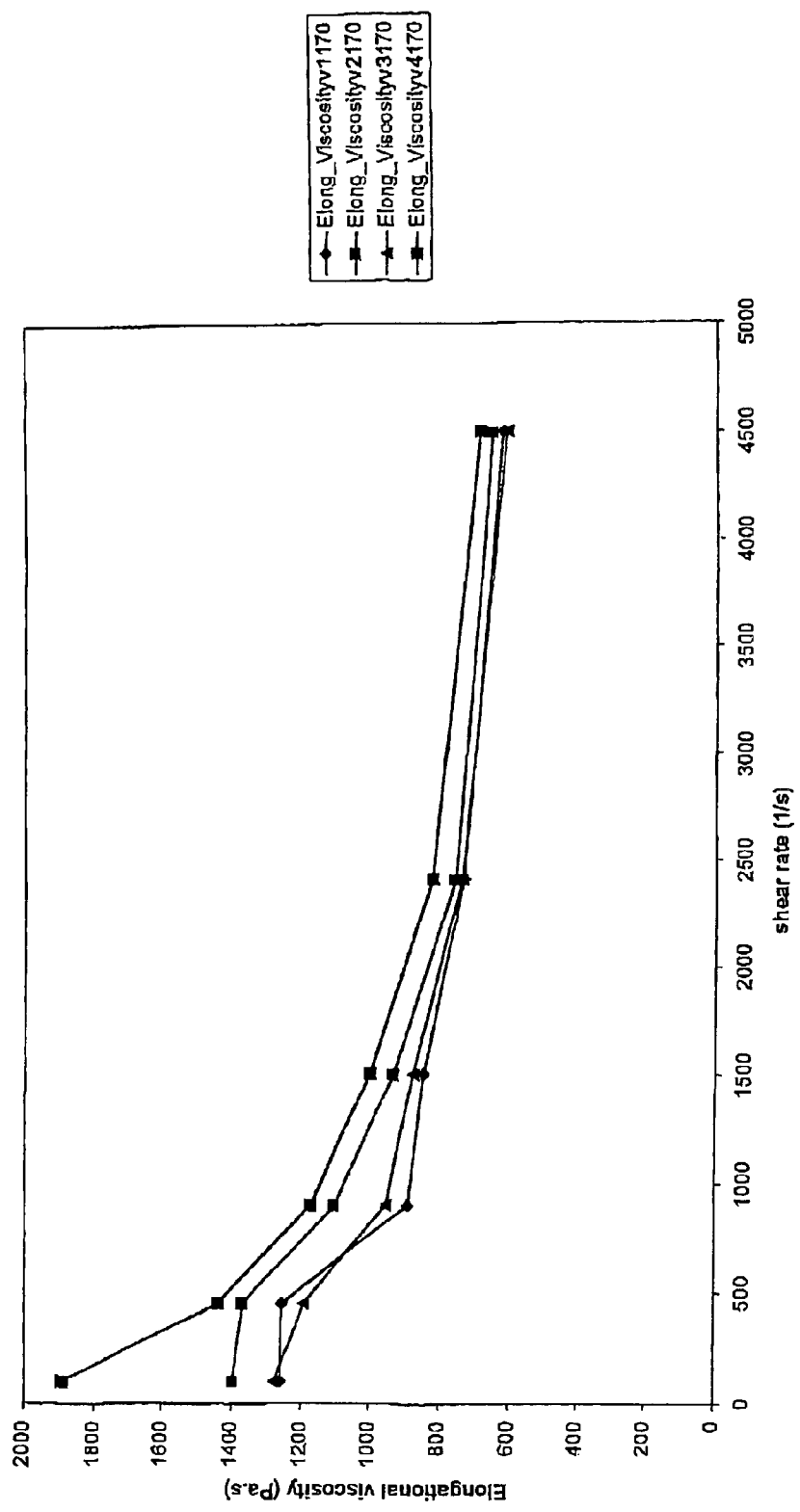
Figure 2  Comparisons of the plot of elongational viscosity vs. shear rate of four heat-activated adhesives in this invention (v1-v4), using a 0.5 mm die at 170 °C.

ADHESIVE

This invention relates to an adhesive particularly but not exclusively adapted for use in engineering applications and comprising modified polypropylene as a base material.

Our earlier UK patent application 00265507.4 discloses a low melting point, low viscosity polypropylene containing adhesive suitable for use in high-speed manufacture of packaging.

WO95/24449 discloses an adhesive composition comprising maleic anhydride-grafted propylene and grafted ethylene/vinyl acetate copolymer. According to a first aspect of the present invention an adhesive composition comprises:

(a) 80 to 100% of a melt blend of 40 to 98% polyalphaolefin which has been grafted with 0 to 5% of at least one ethylenically unsaturated carboxylic acid or derivative thereof,
(b) 2 to 60% of at least one copolymer of ethylene and vinyl acetate;
(c) 0 to 20% of an opacifier;
(d) optional further ingredients;

wherein the total amount of components (a) and (b) is 80–100% of the composition and wherein the percentages of the components are selected to total 100%.

Percentages and other proportions referred to in this specification are by weight unless indicated otherwise.

An adhesive composition in accordance with the present invention may be applied by a doctor or other means onto a substrate. It may also be formed into a film which can be applied onto a substrate in a variety of ways such as compaction. A film of the present invention can be employed as a free-standing film. Alternatively, the adhesive composition may be formed into rods, pellets or otherwise shaped portions to facilitate application to a substrate.

Films or other structures formed from compositions of this invention may have the advantage of being printable. The films or structures may be transparent, that is having no apparent phase separation. The transparency is advantageous and unexpected, particularly because ethylene vinyl acetate compositions are commonly opaque.

The polyalphaolefin is preferably a polymer of an alpha-olefin of formula $(CH_2.CHR)_n$, wherein R is $C_1$–$C_6$ alkyl. The preferred polyalphaolefin is selected from polypropylene and copolymers thereof.

The rheological behaviour of the formulations described in this invention is important for film forming, doctoring and other processing methodologies for which it is suitable. The rheological characteristics of the formulations are also important in relation to their capacity to wet substrates. Typical shear and elongational viscosities of a preferred formulation are shown in FIG. 1 and FIG. 2, respectively.

The functionalised polypropylene may be produced directly by reactive modification by using radical chemistry where the functional group can be isocyanate, anhydride, amine, alcohol or acid, preferably having a melt flow index of 10 to 120 preferably 10 to 95, more preferably 50 to 60 at 190° C. The functional polypropylene may also be made by copolymerisation of propylene with suitable diolefine monomer and then subsequent modification of the pendant unsaturation. Maleic anhydride grafted polypropylenes may be employed. Alternatively 2,2'-dimethyl-1,3-isopropenyl benzyl isocyanate (also known as dimethyl meta-isopropenyl benzyl isocyanate) (TMI) modified polypropylenes as disclosed in WO96/34024, WO96/3403 1 and WO98/13398 may be employed.

The unmodified ethylene/vinyl acetate copolymer is preferably an unmodified random or statistical copolymer having a melt flow index of not more than 800, preferably not more than 600, more preferably not more than 400 at 190° C. A vinyl acetate content of up to 40% in the copolymer may be employed, preferably around 28%.

Preferred adhesives in accordance with this invention do not incorporate an opacifier. However, opacifiers which can be used include inorganic particulates, for example, mica, talc and inorganic sulphates, carbonates, halides and pigments, Organic opacifiers include insoluble particulate materials including polymers such as polystyrene, polyesters, polyamides, polyacrylates, polymethacrylates, inks, pigments and colorants.

Adhesives in accordance with this invention may be applied in solid form to a workpiece, for example, as a sheet of film, by spraying or as pellets and then heated to cause melting of the adhesive. Conventional hot compaction using hot plates or a heated press may be employed. Alternatively, a metal workpiece or substrate may be heated to cause melting of the adhesive.

In a further alternative laser heating may be used for materials which are transparent to laser radiation. Heating efficiency may be enhanced by using infrared absorbent materials in the composition.

The following results are illustrative of the good bonding which can be achieved using one method of heat application and one physical form of the adhesive. Satisfactory bond strengths are achieved using other heat sources for the activation of the adhesive, such as hot compaction. The reduction in bond strengths as temperature is increased reflects the intrinsic change in modulus of the adhesive formulation. The higher the content of modified polypropylene in the formulation the better the high temperature bond strength. Those skilled in the art can design formulations to achieve optimal wetting, bond strength and processability for any given means of heat application to effect good bonds.

Induction heating or dielectric heating may be used with compositions to which metal particles, for example, iron filings, have been added.

The invention also promotes an article adapted to be secured to another article includes a surface carrying a pre-coated layer of an adhesive in accordance with the present invention.

Compositions in accordance with this invention may be manufactured by melt blending of the key components in a batch blunder or by using an extruder, for example, a twin-screw extruder. This is the preferred method as the adhesives can be pelletised for processing by standard injection moulding, extrusion or a range of other commonly used polymer processing methods. The adhesive can be readily formed into different shapes e.g. gaskets for bonding shaped work pieces.

The adhesive formulation described is particularly well suited to the bonding of polypropylene to polypropylene and the substrates can be in the form of sheet, woven fabric or other physical forms. The adhesives in accordance with this invention may also be used for the bonding of many different substrates or combinations of substrates including: aluminium, steel, cellulosic materials, melamine laminates and leather.

The invention finds a particular application in manufacture of engineering mechanical components or articles wherein a high bond strength is desired. Bonding of polypropylene surfaces is facilitated.

In a continuous process a film in accordance with this invention may be dispensed between surfaces to be bonded, nipped by compression of the surfaces and then heated to cause melt adhesion. Large flat surfaces can be bonded in a continuous process. Large curved or other shaped surfaces can be thermoformed in a semi-continuous process. This is all improvement over prior processes in which the adhesive is applied by spraying. Spraying results in the poor control of the thickness, integrity and density of the adhesive layer. Laminated panels may be manufactured using aluminium or other metal sheets.

The invention is further described by means of example but not in any limitative sense, with reference to the accompanying drawings of which:

FIG. 1 is a graph comparing shear viscosity vs. shear rate or for an adhesive in accordance with this invention.

FIG. 2 is a graph comparing elongational viscosity vs. shear rate for an adhesive in accordance with this invention.

EXAMPLE 1

An APV 2030, 30 mm diameter screw, 40:1 L/D, co-rotating twin-screw extruder was used in a continuous method of manufacturing of the adhesive. A mixture of maleic anhydride functionalised polypropylene and ethylene/vinyl acetate copolymer (EVA) pellets at a weight ratio of 80:20 was fed continuously into the hopper of the extruder. The feed rate was approximately 17.5 kgh$^{-1}$ and the extrusion temperature was approximately 170° C. The extrudate was then passed through a water bath. The solidified extrudate was finally cut up into suitable size pellets for further applications.

EXAMPLE 2

Approximately 4 kg of the adhesive pellets as described in Example 1 was dried overnight in an oven at 60° C. The pre-dried pellets were then extruded into rolls of film of approximately 250 mm in width and 70 microns in thickness. The extrusion temperature was approximately 180° C. and the wind-up speed was 1.5 mmin$^{-1}$. This process was later scaled up to manufacture adhesive film of 1.1 m in width and 60 microns in thickness.

EXAMPLE 3

The thermal behaviour of the adhesive as described in Example 1 was examined by differential scanning calorimetry and melt rheometry. The onset and the peak of melting of the adhesive were found at approximately 130° C. and 145° C. respectively. Typical shear and elougational viscosities of the preferred formulation, measured at 170° C., are shown in FIG. 1 and FIG. 2 respectively.

EXAMPLE 4

The bond strength of the adhesive as described in Example 1 was examined by lap-shear test of single overlap joints (with reference to BS 5350: Part C5: 1990, ASTM D 1002-94 and D3164-97) and T-peel test (with reference to BS 5350: Part C12:1994 and ASTM D 1876-95). Sheets of glass-filled polypropylene, aluminium and mild steel sheet were used to prepare all the test samples. The adhesive films, as described in Example 2, were used to prepare the bonds. The sample surface was degreased with acetone prior to bonding. No further surface treatment was carried out. The bonding temperature and contact time were 155° C. and 1 minute respectively. A gentle pressure was applied to ensure a good contact between the adhesive and the bonding surfaces. Results are shown in Tables 1 and 2.

TABLE 1

Variation of shear strength (values in MPa) of the adhesive film, as described in Example 2, on various adherends with temperature.

| Temperature (° C.) | −40 | −20 | 0 | 18 | 40 | 70 | 100 | 130 |
|---|---|---|---|---|---|---|---|---|
| Mild steel | 20.80 | 20.30 | 18.32 | 14.33 | 11.29 | 7.02 | 5.77 | 3.01 |
| Aluminium | 12.31 | 12.62 | 12.19 | 11.48 | 8.88 | 7.23 | 2.61 | 2.37 |
| Glass-filled PP | — | — | — | 11.37 | — | — | — | — |

TABLE 2

Variation of peel strength (values in N/mm) of the adhesive film, as described in Example 2, on various adherends with temperature.

| Temperature (° C.) | −40 | −20 | 0 | 18 | 40 | 70 | 100 | 130 |
|---|---|---|---|---|---|---|---|---|
| Mild steel | 4.18 | 3.74 | 3.92 | 6.36 | 5.78 | 3.67 | 3.37 | 1.57 |
| Aluminium | 1.86 | 1.97 | 2.58 | 4.78 | 5.67 | 4.13 | 2.60 | 1.38 |
| Glass-filled PP | — | — | — | 3.70 | — | — | — | — |

EXAMPLE 5

Semi-translucent isotropic polypropylene, approximately 3 mm thick, was laser-welded at different laser pass rates to 0.7 mm mild steel plate, using an adhesive film as described in Example 2. The effectively bonded area varied greatly dependent on the speed of the laser over the joint. The laser-welded samples were then cut into 25 mm parallel strips for testing their lap-shear strength. Results are shown in Table 3. The most effective laser speed over the material to effect good bonding in this example is in the region of 200 mmmin$^{-1}$ but this changes with laser power and the substrates being bonded. When the substrate is opaque but conducts heat rapidly, as in the case for most metals, it is possible to achieve similar bond strengths by applying the laser heating to the metal surface.

TABLE 3

Variation of shear strength of the laser-welded samples with laser speed.

| Laser speed (mmmin$^{-1}$) | 100 | 150 | 175 | 200 | 225 | 250 |
|---|---|---|---|---|---|---|
| Maximum strength (MPa) | 4.2 | 6.8 | 12.1 | 16 | 10.3 | 9.5 |

EXAMPLE 6

Composites comprising a sandwich structure of hot-compacted PP sheet/PP foam or PP honeycomb/PP sheet were prepared in a continuous laminating process using the adhesive film, as described in Example 2, as bonding agent. The laminating temperature and speed were 160° C. and 3 mmin$^{-1}$ respectively. These composites exhibit good impact resistant properties and recyclability.

The invention claimed is:

1. A freestanding adhesive film comprising:
   (a) 80 to 100% of a melt blend of 40 to 98% polypropylene which has been grafted with 0 to 5% of at least one ethylenically unsaturated carboxylic acid or derivative and having a melt flow index of 10–95 at 190° C., and 2 to 60% of at least one copolymer of ethylene and vinyl acetate; and
   (b) 0 to 60% of an opacifier;
   wherein the total amount of components (a) and (b) is 80–100% of the film composition and wherein the percentages of the components are selected to total 100%.

2. An adhesive mm as claimed in claim 1, wherein the melt flow index is 50–60 at 190° C.

3. An adhesive film as claimed in claim 1, wherein the copolymer of ethylene and vinyl acetate has a melt flow index of not more than 800, at 190° C.

4. An adhesive film as claimed in claim 1, wherein the copolymer of ethylene and vinyl acetate has a vinyl acetate content of up to 40%.

5. An adhesive film as claimed in claim 4, wherein the vinyl acetate content is about 28%.

6. An adhesive film as claimed in claim 1, wherein the copolymer of ethylene and vinyl acetate has a melt flow index of not more than 600 at 190° C.

7. An adhesive film as claimed in claim 1, wherein the copolymer of ethylene and vinyl acetate has a melt flow index of not more than 400 at 190° C.

8. An adhesive film as claimed in claim 1 having 0% opacifier, wherein the film is transparent.

9. A method of uniting surfaces of juxtaposed layers using a freestanding adhesive film composition as claimed in claim 1, the method comprising:
   contacting the film with a first layer,
   contacting the second layer to the film, and
   causing the film to melt and subsequently solidify on cooling to form a united article.

10. A method as claimed in claim 9, wherein one or more of said layers is heated, to cause melting of the adhesive film.

11. A method as claimed in claim 9, wherein the layers are compacted against the adhesive film using hot plates or heated press.

12. A method as claimed in claim 9, wherein the adhesive film is heated by laser heating.

13. A method as claimed in claim 12, wherein the adhesive film composition includes an infrared absorbent material.

14. A method as claimed in claim 9, wherein the adhesive film is heated by induction or dielectric heating.

15. A method as claimed in claim 14, wherein the adhesive film includes metal particles.

16. A method as claimed in claim 9, wherein one of both layers comprises polypropylene.

17. A method as claimed in claim 16, wherein both of said layers are polypropylene.

18. A method as claimed in claim 9, wherein the layers are compacted against the adhesive film at a temperature of 155° C.

* * * * *

UNITED STATES PATENT AND TRADEMARK OFFICE
CERTIFICATE OF CORRECTION

PATENT NO. : 7,037,968 B2
APPLICATION NO. : 10/221416
DATED : May 2, 2006
INVENTOR(S) : Tsui et al.

It is certified that error appears in the above-identified patent and that said Letters Patent is hereby corrected as shown below:

In the Title Page:

In the (73) Assignee section, change "Glued LTD, Leeds (GB)" to --Gluco LTD, Leeds (GB)--.

Signed and Sealed this

First Day of January, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,037,968 B2 | Page 1 of 1 |
| APPLICATION NO. | : 10/221416 | |
| DATED | : May 2, 2006 | |
| INVENTOR(S) | : Tsui et al. | |

It is certified that error appears in the above-identified patent and that said Letters Patent is hereby corrected as shown below:

In the Title Page:

In the (73) Assignee section, change "Glued LTD, Leeds (GB)" to --Gluco LTD, Leeds (GB)--.

Signed and Sealed this

Eighth Day of January, 2008

JON W. DUDAS
*Director of the United States Patent and Trademark Office*